(12) United States Patent
Aguirre et al.

(10) Patent No.: US 8,806,542 B2
(45) Date of Patent: *Aug. 12, 2014

(54) SCANNING AND SELECTING AN ANTENNA BEAM PROVIDED IN FIXED WIRELESS CUSTOMER PREMISES EQUIPMENT

(75) Inventors: Sergio Aguirre, Southlake, TX (US); Raafat Edward Kamel, Little Falls, NJ (US); Kamlesh S. Kamdar, Dublin, CA (US); Lalit R. Kotecha, San Ramon, CA (US); Jae-Wook Song, Kyungki-Do (KR)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 516 days.

This patent is subject to a terminal disclaimer.

(21) Appl. No.: 13/154,011

(22) Filed: Jun. 6, 2011

(65) Prior Publication Data

US 2012/0311643 A1    Dec. 6, 2012

(51) Int. Cl.
*H04N 7/20* (2006.01)
(52) U.S. Cl.
USPC .......................................................... 725/72

(58) Field of Classification Search
None
See application file for complete search history.

(56) References Cited

U.S. PATENT DOCUMENTS

| 5,376,941 | A * | 12/1994 | Fukazawa et al. | 342/359 |
| 6,337,658 | B1 * | 1/2002 | Tong et al. | 342/359 |
| 2003/0228857 | A1 * | 12/2003 | Maeki | 455/278.1 |
| 2004/0157611 | A1 * | 8/2004 | Smith et al. | 455/445 |
| 2004/0157637 | A1 * | 8/2004 | Steer et al. | 455/525 |
| 2005/0179607 | A1 | 8/2005 | Gorsuch et al. | |
| 2007/0173303 | A1 | 7/2007 | Viorel et al. | |
| 2010/0311321 | A1 | 12/2010 | Norin | |
| 2010/0313232 | A1 | 12/2010 | Norin | |

* cited by examiner

*Primary Examiner* — Cai Chen

(57) ABSTRACT

An outdoor broadband unit receives a current time, a short term maintenance mode time period, and a long term maintenance mode time period from a remote network device. The outdoor broadband unit determines a mode associated with selection of an antenna beam, provided on an antenna of the outdoor broadband unit, based on at least one of the current time, the short term maintenance mode time period, and the long term maintenance mode time period. The outdoor broadband unit selects an antenna beam to use based on the determined mode.

21 Claims, 12 Drawing Sheets

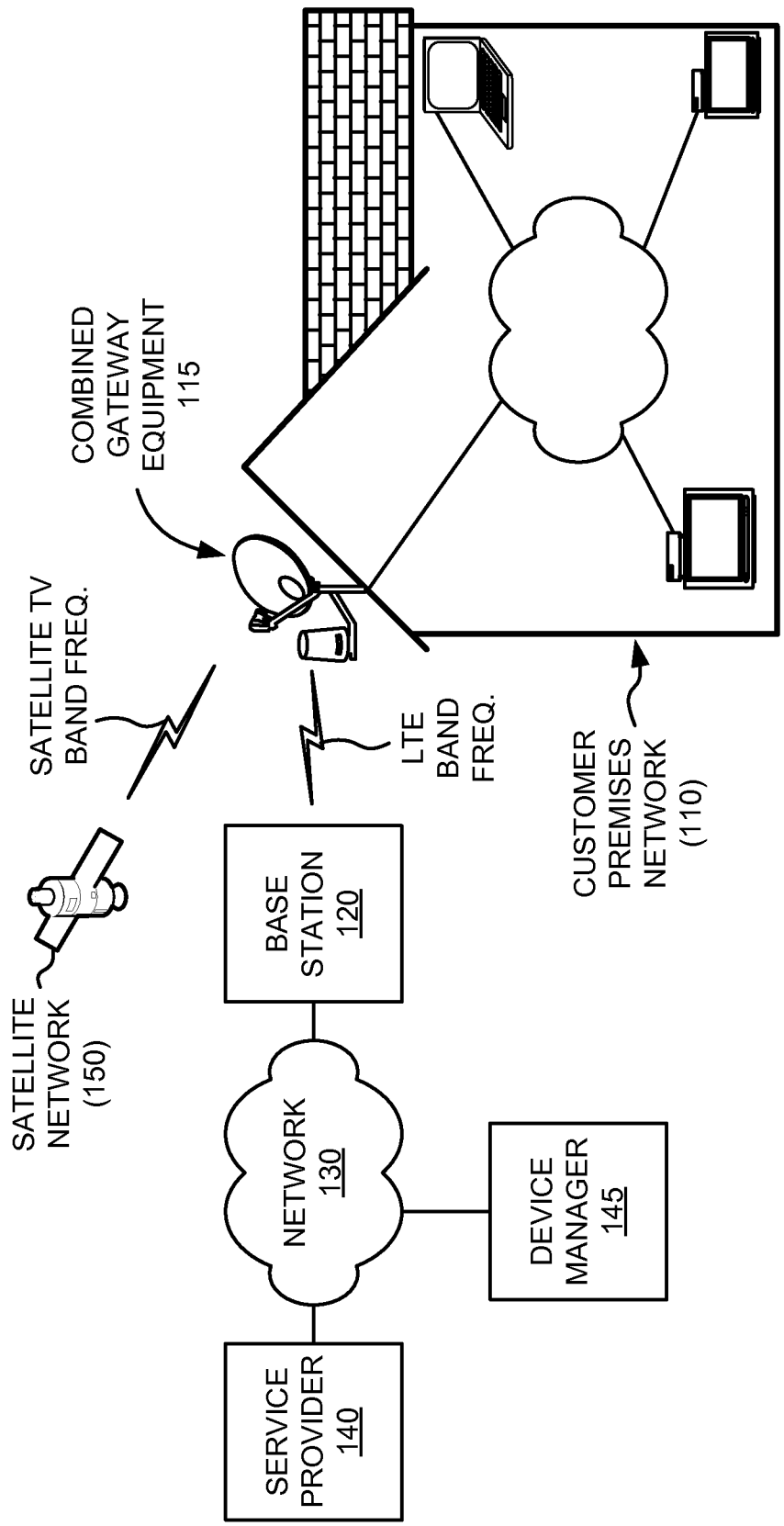

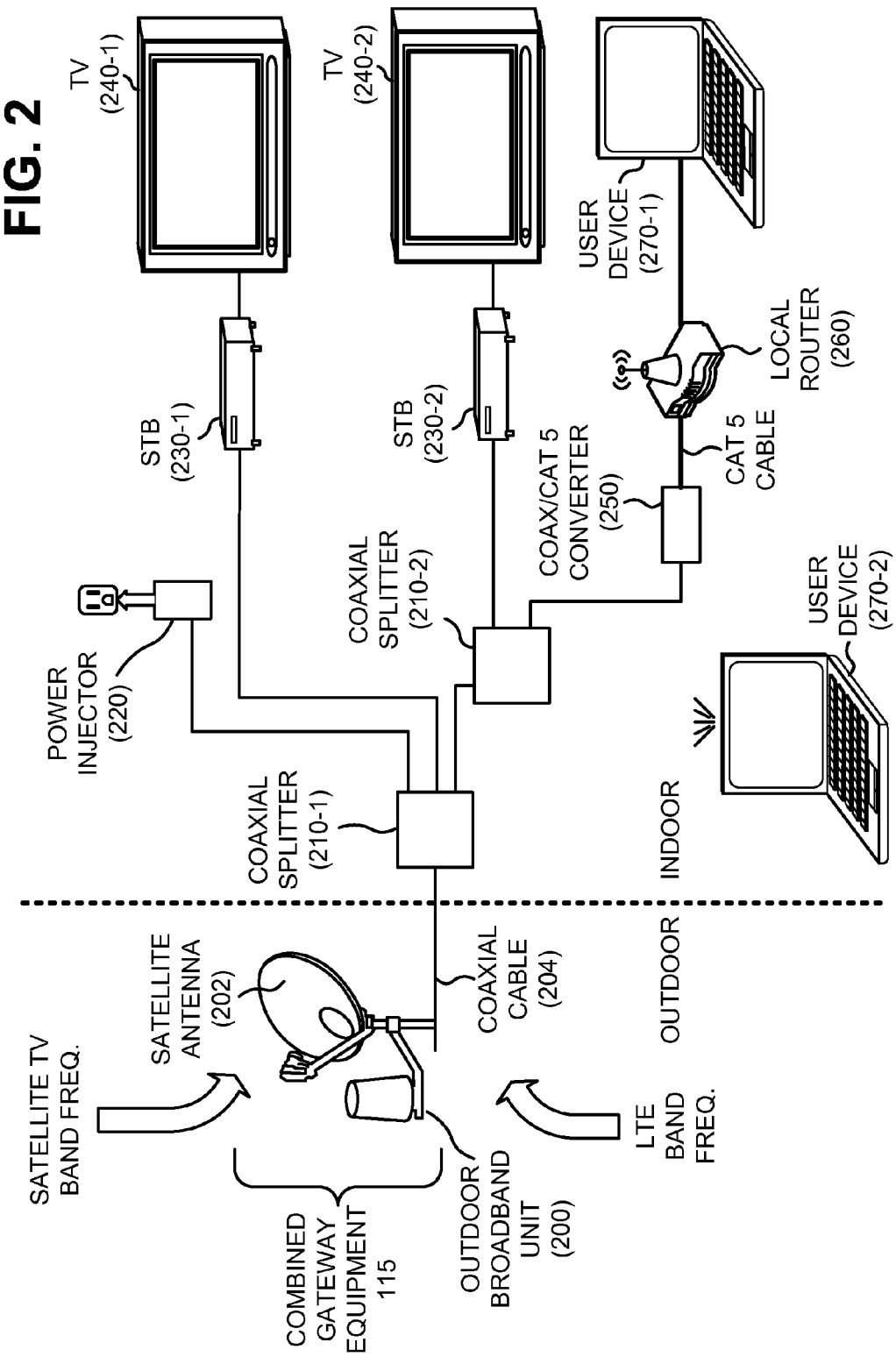

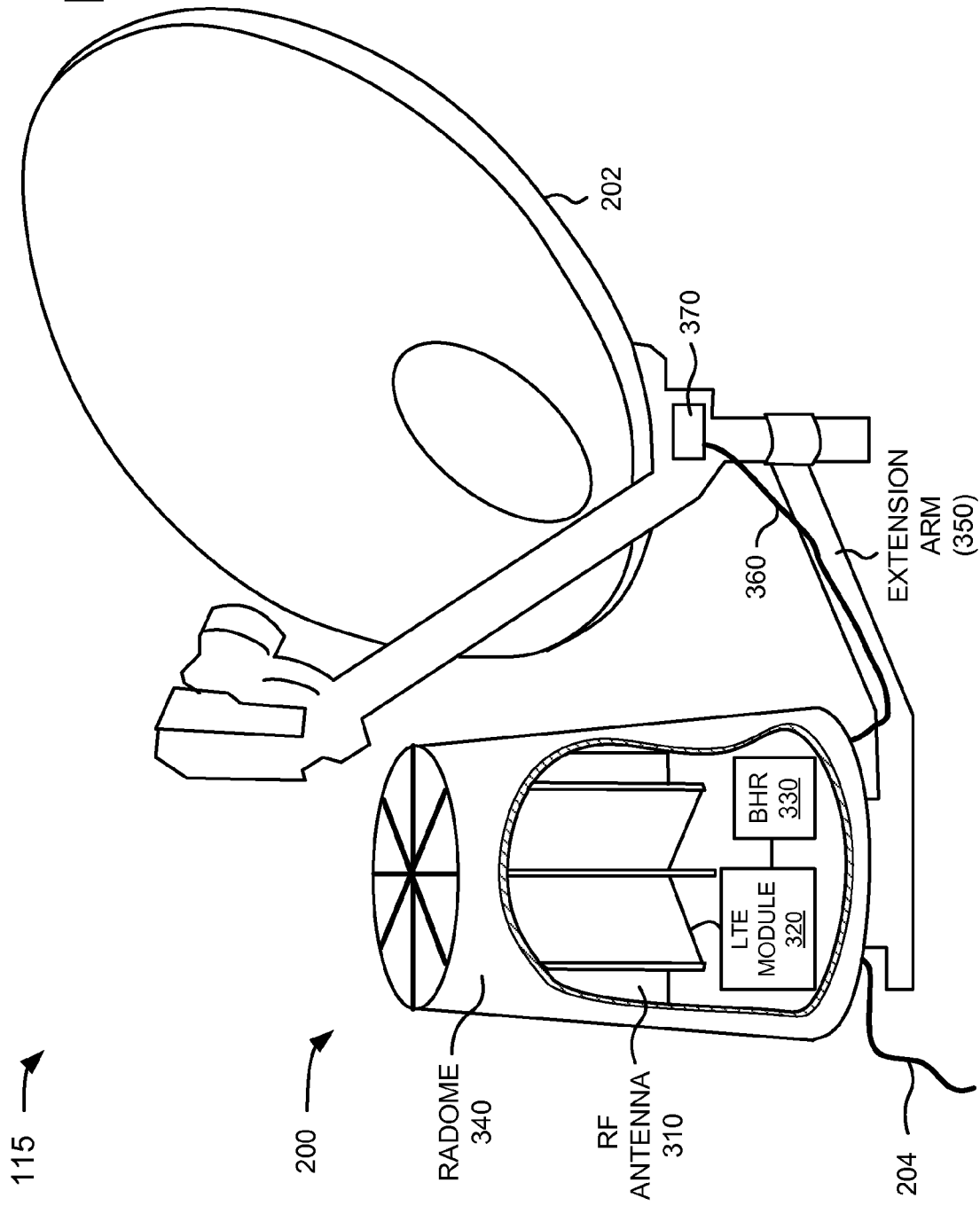

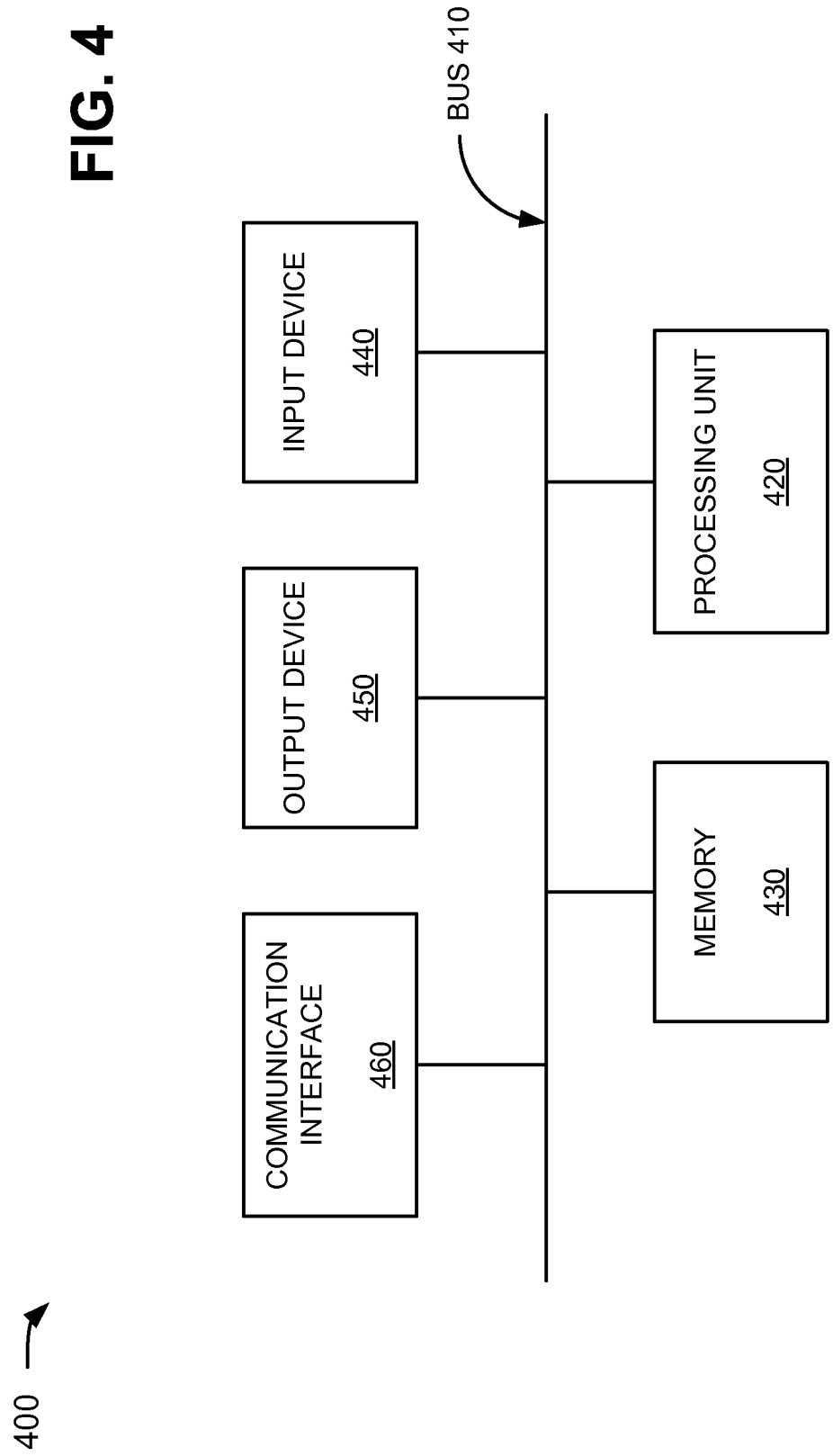

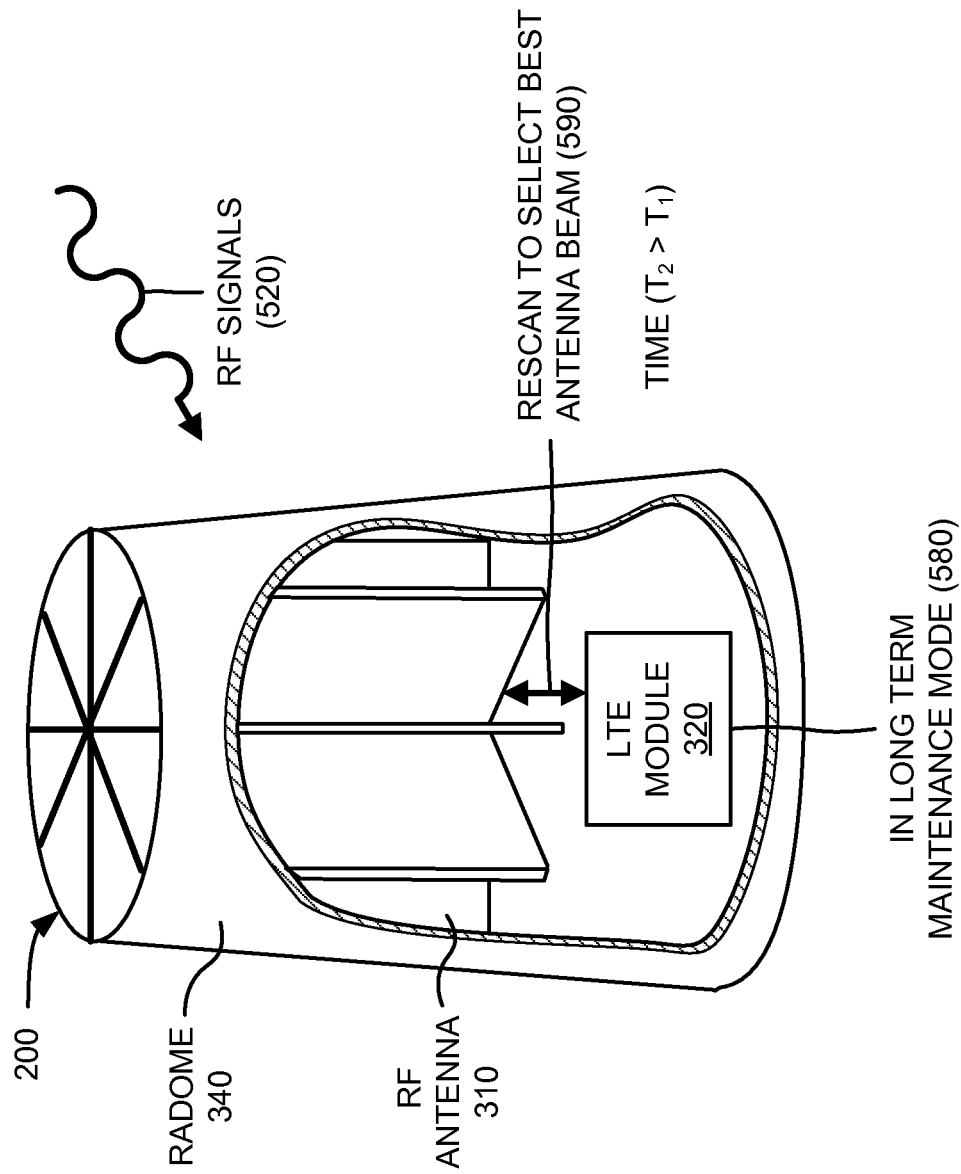

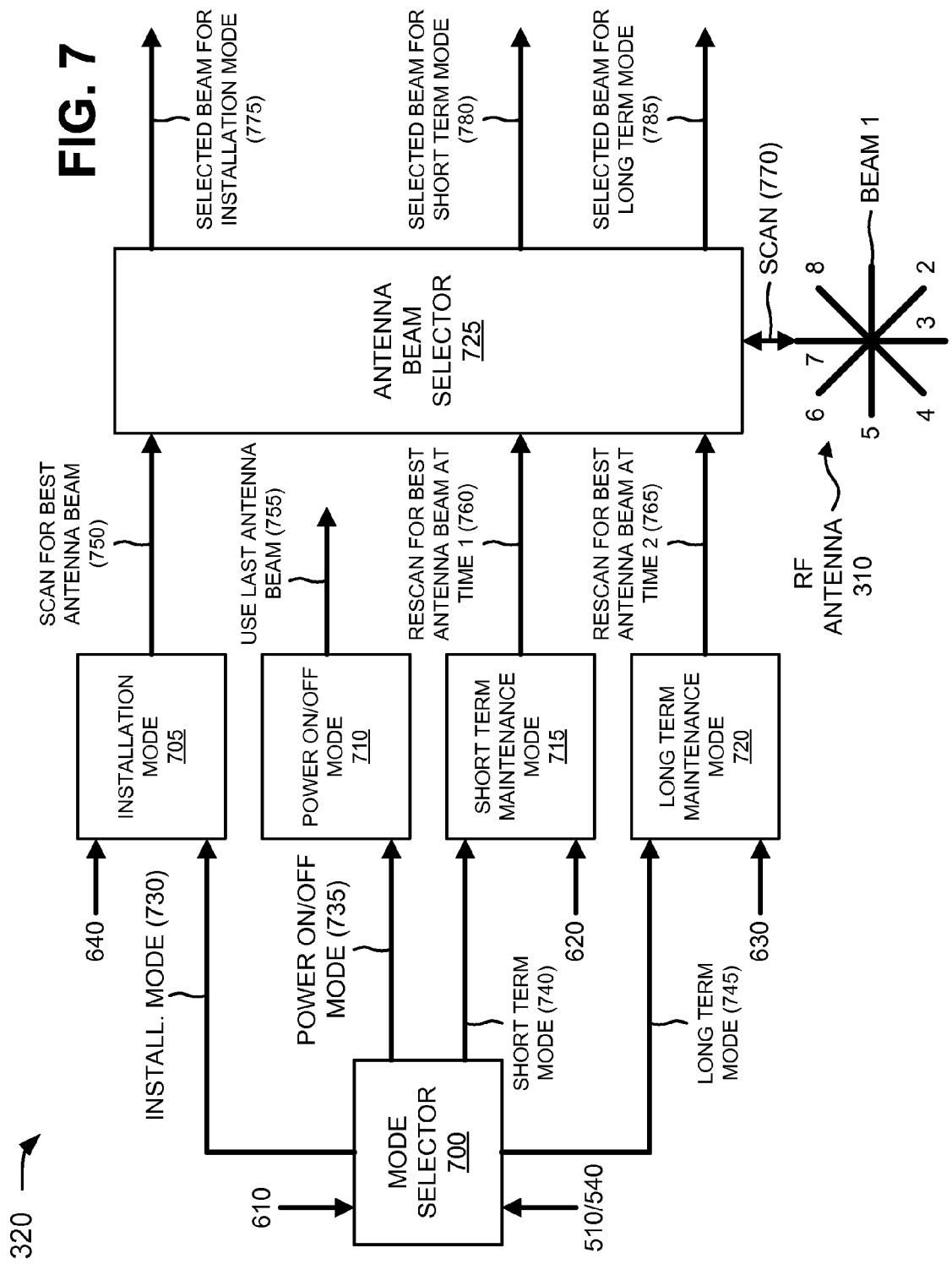

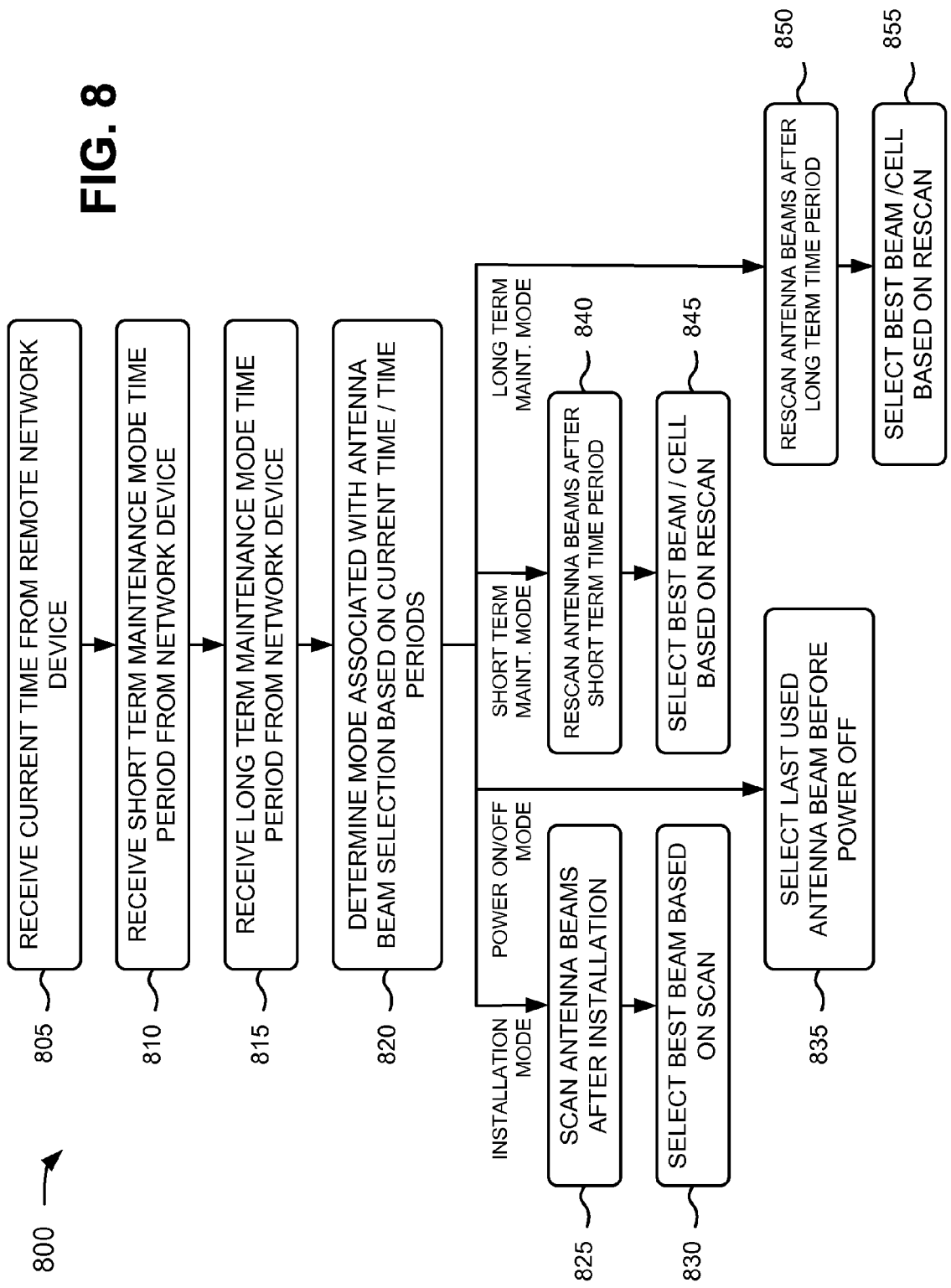

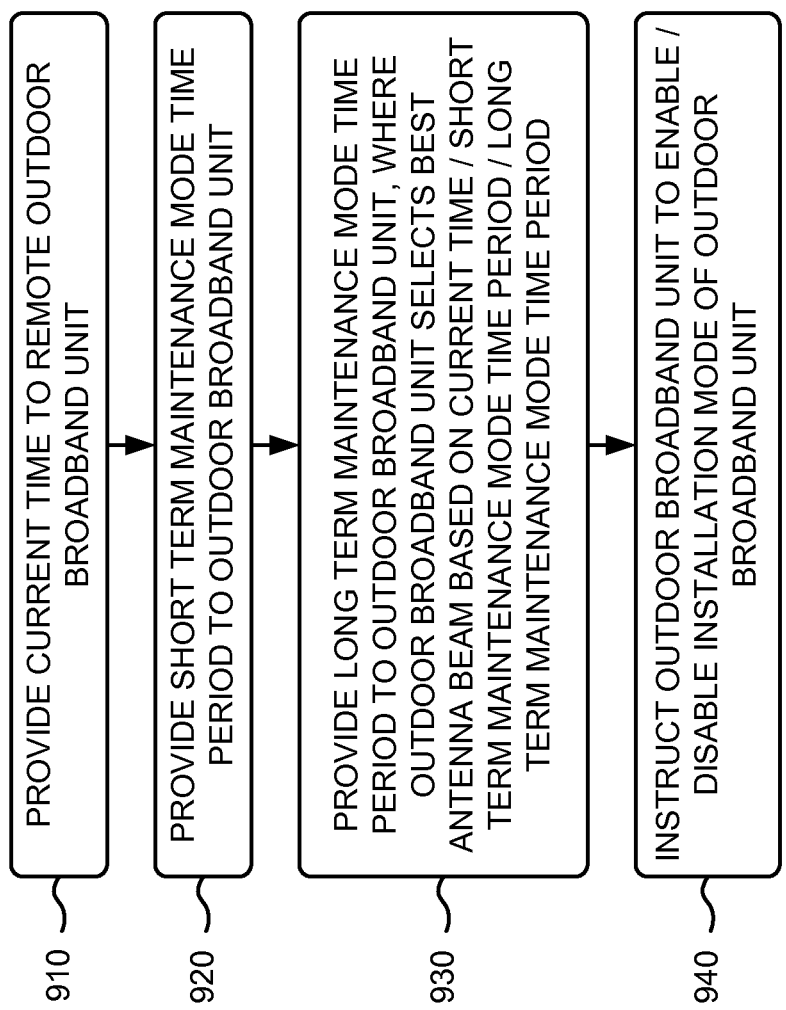

SCANNING AND SELECTING AN ANTENNA BEAM PROVIDED IN FIXED WIRELESS CUSTOMER PREMISES EQUIPMENT

BACKGROUND

Bundled media services, such as combination packages of television, telephone, and broadband Internet services, have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless networks for some of these services (e.g., broadband access). However, previous generations of fixed wireless networks have generally been unsuccessful. Expensive network equipment and customer premises equipment (CPE), high CPE installation costs, use of proprietary technology, and low data rates are among some of the reasons that these fixed wireless networks remained unpopular. As wireless network data rates improve using fourth generation (4G) technologies, such as Long-Term Evolution (LTE), such network data rates have made it easier to implement fixed wireless networks.

BRIEF DESCRIPTION OF THE DRAWINGS

FIG. 1 is a diagram of an example environment in which systems and/or methods described herein may be implemented;

FIG. 2 is a diagram of an example customer premises network illustrated in FIG. 1 according to an implementation described herein;

FIG. 3 is a diagram of example components of a combined gateway of the customer premises network depicted in FIG. 2;

FIG. 4 is a diagram of example components of a device that may correspond to one of the devices of FIG. 1 or 2;

FIGS. 5A-5D are diagrams of example operations capable of being performed by an outdoor broadband unit depicted in FIGS. 2 and 3;

FIG. 7 is a diagram of example functional components of a LTE module of the outdoor broadband unit;

FIG. 8 is a flow chart of an example process for scanning and selecting an antenna beam provided in a fixed wireless CPE according to an implementation described herein; and FIG. 9 is a flow chart of an example process for providing configuration parameters to a fixed wireless CPE to enable antenna beam scanning and selecting according to an implementation described herein.

DETAILED DESCRIPTION OF PREFERRED EMBODIMENTS

Figure 5A:
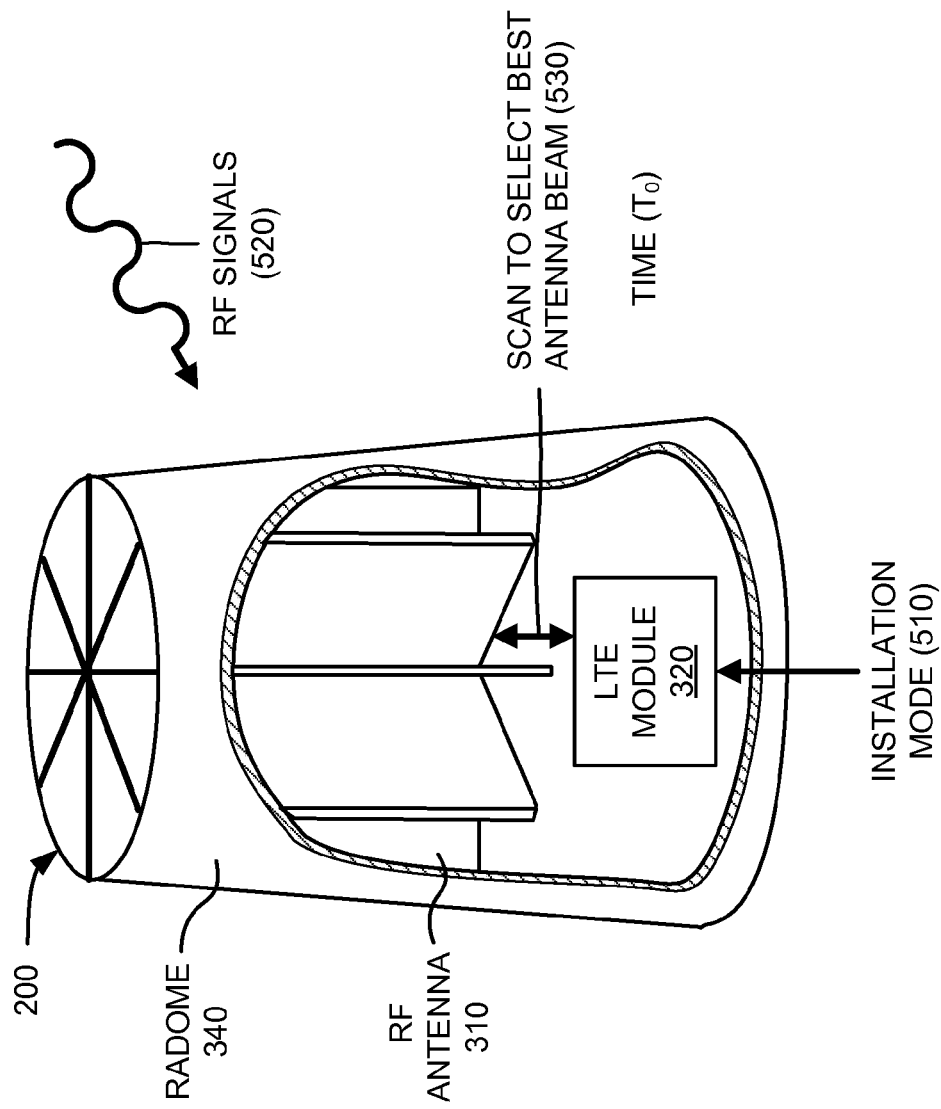

The following detailed description refers to the accompanying drawings. The same reference numbers in different drawings may identify the same or similar elements.

Systems and/or methods described herein may provide configuration parameters that enable antenna beam scanning and selecting, to customer premises equipment (CPE) wireless architecture that includes combined gateway equipment. The combined gateway equipment may include satellite and radio frequency (RF) antennas that are installed at a customer premises. The RF antenna may be provided in an outdoor broadband unit that includes a LTE module capable of communicating with a wireless network. The outdoor broadband unit may also include a broadband home router (BHR) capable of communicating with a customer premises network.

The RF antenna may include several antenna elements that can be used individually or combined to synthesize several overlapping antenna beams spanning three-hundred and sixty (360) degrees in azimuth. In one implementation, the RF antenna may include a wideband multiple beam antenna, with partially overlapping antenna beams, spanning three-hundred and sixty (360) degrees in azimuth (x-y plane). For example, the RF antenna may include between four and eight beams to achieve desirable antenna gains and reduction of interference. Additionally, or alternatively, the RF antenna may employ two polarizations per beam for 2×2 downlink multiple-input and multiple-output (MIMO) operation. In another implementation, the RF antenna may include a fixed dually-polarized directional antenna. As a directional antenna, the RF antenna may use polarizations matched to the polarizations of a particular base station. For example, a polarization of the RF antenna may match a polarization of a serving enhanced Node B (eNB) or base station. Antenna pointing for the directional antenna may be conducted, for example, during installation of the outdoor broadband unit.

In one example implementation, the outdoor broadband unit may operate in several modes, such as an installation mode, a power on/off mode, a short term maintenance mode, and a long term maintenance mode. For example, the outdoor broadband unit may be in the installation mode after an installer installs the outdoor broadband unit at the customer premises. During the installation mode, the outdoor broadband unit may scan beams of the RF antenna, and may select a best or optimal RF antenna beam based on the scan and based on the RF signals received by the RF antenna beams.

In another example, the outdoor broadband unit may be in the power on/off mode when the outdoor broadband unit is powered off and powered on (i.e., power cycled). The outdoor broadband unit may enter the power on/off mode when recovering from a power outage. During the power on/off mode, rather than scanning the RF antenna beams, the outdoor broadband unit may select a RF antenna beam that was last used by the outdoor broadband unit before the outdoor broadband unit was powered off. After entering the power on/off mode, the outdoor broadband unit may transition to a long term maintenance mode, described below.

In still another example, the outdoor broadband unit may enter the short term maintenance mode after a particular time period (e.g., a number of hours). In the short term maintenance mode, the outdoor broadband unit may rescan the RF antenna beams, and may select a best RF antenna beam based on the rescan and based on the RF signals received by the RF antenna beams. The outdoor broadband unit may perform this rescan of the RF antenna beams without losing a connection with a wireless network (e.g., a LTE network). In another words, the rescan may be performed while the wireless network is actively communicating with the outdoor broadband unit.

In a further example, the outdoor broadband unit may enter the long term maintenance mode after a particular time period (e.g., a number of days). In the long term maintenance mode, the outdoor broadband unit may rescan the RF antenna beams, and may select a best RF antenna beam based on the rescan and based on the RF signals received by the RF antenna beams. During the long term maintenance mode, the outdoor broadband unit may reselect a serving base station(s) or may execute handoffs based on prevailing RF channel conditions. In one example, the outdoor broadband unit may select a different serving cell (e.g., a base station) based on the long term maintenance mode rescan.

FIG. 1 is a diagram of an example environment 100 in which systems and/or methods described herein may be implemented. As illustrated, environment 100 may include a customer premises network 110, combined gateway equipment 115, a base station 120, a network 130, a service provider 140, a device manager 145, and a satellite network 150. A single customer premises network 110, base station 120, network 130, service provider 140, device manager 145, and satellite network 150 have been illustrated in FIG. 1 for simplicity. In practice, there may be more customer premises networks 110, combined gateways 115, base stations 120, networks 130, service providers 140, device managers 145, and/or satellite networks 150.

Customer premises network 110 may include one or more devices connected to each other, base station 120, and/or satellite network 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN. In the example shown in FIG. 1, customer premises network 110 may connect to base station 120 through a two-way wireless connection, such as using a LTE band frequency, and may connect to satellite network 150 through a one-way (e.g., downlink) wireless connection, such as using a satellite television (TV) band frequency. The two-way wireless connection and the one-way wireless connection may be implemented using combined gateway equipment 115.

Combined gateway equipment 115, which is described in more detail below, may generally include mechanisms for communicating with satellite network 150 (to provide satellite-based communications) and for communicating with base station 120 (to provide RF-based communications). Combined gateway equipment 115 may connect, such as via a coaxial connection, to devices inside of the customer premises, such as the devices connected to customer premises network 110.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one example implementation, base station 120 may utilize LTE standards operating in a 700 megahertz (MHz) frequency band.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one example implementation, network 130 may include core network equipment, such as a packet data network (PDN) gateway (PGW), a serving gateway (SGW), a mobility management entity (MME), etc.

Service provider 140 may include one or more server devices, or other types of computation or communication devices, that gather, process, search, and/or provide information in a manner described herein. In one implementation, service provider 140 may include a web server, a computer system, an application, a cable head-end, and/or a broadcasting device capable of providing Internet protocol (IP)-based content and/or services to devices in customer premises network 110.

Device manager 145 may include one or more server devices, or other types of computation or communication devices, that gather, process, search, and/or provide information in a manner described herein. In one implementation, device manager 145 may manage the operation of an outdoor broadband unit of combined gateway equipment 115. For example, device manager 145 may maintain data regarding the operation of the outdoor broadband unit, generate one or more reports based on the maintained data, and provide the generated reports to one or more devices, such as a user device in customer premises network 110.

In addition, device manager 145 may maintain configuration information for the outdoor broadband unit and provide the configuration information to the outdoor broadband unit. For example, the outdoor broadband unit may enter different modes (e.g., the installation mode, the short term maintenance mode, and/or the long term maintenance mode) depending on a particular time period. Thus, in one example implementation, device manager 145 may provide a current time to the outdoor broadband unit so that the outdoor broadband unit, which may use the current time to determine whether a particular time is occurring. In another example implementation, device manager 145 may provide a short term maintenance mode time period or interval (e.g., in a number of hours) to the outdoor broadband unit so that the outdoor broadband unit may know when to enter the short term maintenance mode. In still another example implementation, device manager 145 may provide a long term maintenance mode time period or interval (e.g., in a number of days) to the outdoor broadband unit so that the outdoor broadband unit may know when to enter the long term maintenance mode.

Device manager 145 may obtain information from the outdoor broadband unit at other times. For example, device manager 145 may obtain information from the outdoor broadband unit upon the outdoor broadband unit being reset. The information may include logs from the outdoor broadband unit indicating, for example, the configuration of the outdoor broadband unit and/or other types of information prior to the outdoor broadband unit being reset. Device manager 145 may connect to network 130 via wired and/or wireless connections.

Satellite network 150 may provide multimedia content from, for example, a direct broadcast satellite (DBS) service provider (not shown). Satellite network 150 may provide a downlink signal over a designated satellite TV band frequency, typically in the range of 950 MHz to 2150 MHz. The downlink signal may be received using a satellite antenna/receiver system at the customer premises to present satellite TV content to a user.

In implementations described herein, customer premises network 110 may combine LTE functionality with satellite TV service. Using combined gateway equipment 115, which includes an outdoor LTE module, both broadband (over LTE) service (e.g., via base station 120) and satellite TV service (e.g., via satellite network 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

FIG. 2 is a diagram of an example customer premises network 110 according to an implementation described herein. As illustrated, combined gateway equipment 115 of customer premises network 110 may include an outdoor broadband unit 200 and a satellite antenna 202. A coaxial cable 204 may connect combined gateway equipment 115 to the indoor portion of customer premises network 110. Customer premises network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110) as part of combined gateway 115. For example, outdoor broadband unit 200 may utilize a pre-existing or a new satellite TV installation in a way that both broadband (over LTE) service and satellite TV are brought indoors (e.g., inside the customer premises) over a coaxial cable 204. Outdoor broadband unit 200 is discussed further in connection with, for example, FIGS. 3 and 5.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter.

Power injector 220 may include a mechanism for injecting direct current (DC) power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a conventional device to convert incoming signals from coaxial cables to outgoing signals on Cat 5 cables. In one example, STB 230 and coax-to-Cat 5 converter 250 may facilitate allocating logical channels using different frequency blocks for viewer-selected television programming and broadband signals.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a Universal Serial Bus (USB) Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a gaming system, etc.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

FIG. 3 is a diagram of example components of combined gateway equipment 115 of customer premises network 110. As illustrated, combined gateway equipment 115 may include outdoor broadband unit 200 and satellite antenna 202. Outdoor broadband unit 200 and satellite antenna 202 my include features described above in connection with, for example, FIGS. 1 and 2. Outdoor broadband unit 200 may include a radio frequency (RF) antenna 310, a LTE module 320, and a broadband home router (BHR) 330, all housed in a radome 340. In one implementation, as shown in FIG. 3, outdoor broadband unit 200 may be mounted on an extension arm 350 connected to a structure (e.g., an arm or a pole) supporting satellite antenna 202.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., base station 120) connected to a network (e.g., network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

In one implementation, RF antenna 310 may include a wideband multiple beam antenna, with partially overlapping antenna beams, spanning three-hundred and sixty (360) degrees in azimuth (x-y plane). For example, antenna 310 may include between four and eight beams to achieve desirable antenna gains and reduction of interference. Additionally, or alternatively, RF antenna 310 may employ two polarizations per beam for 2×2 downlink multiple-input and multiple-output (MIMO) operation. In another example, RF antenna 310 may employ slant ±45° polarization or vertical/horizontal polarization.

In another implementation, RF antenna 310 may include a fixed dually-polarized directional antenna. As a directional antenna, RF antenna 310 may use polarizations matched to the polarizations of a particular base station (e.g., base station 120). For example, a polarization of RF antenna 310 may match a polarization of a serving enhanced Node B (eNB) or base station (e.g., base station 120). Antenna pointing for the directional antenna may be conducted, for example, during installation of outdoor broadband unit 200.

LTE module 320 may include a device (e.g., a modem) with communication capability via an air interface. For example, LTE module 320 may receive broadband signals and/or voice over Internet protocol (VoIP) signals from base station 120 (e.g., via RF antenna 310) and may transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 320 may select any of the RF antenna 310 beams, based on real-time measurements, during normal operation.

BHR 330 may include a device for buffering and forwarding data packets toward destinations. For example, BHR 330 may receive data packets from base station 120 (e.g., via LTE module 320) and may forward the data packets toward user devices 270. In addition, BHR 330 may receive data packets from user devices 270 (e.g., via local router 260) and may forward the data packets toward recipient devices (e.g., service provider 140) via network 130.

In one example implementation, BHR 330 may be associated with a coaxial network controller (not shown) that provides an interface for Ethernet over coaxial signals, such as signals transmitted over coaxial cable 204 and into customer premises network 110. The coaxial network controller may act as a bridge device to receive signals from LTE module 320 via a wired USB connection and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller may be inserted in a Mid-RF MoCA channel that is separate from the 950 MHz to 2150 MHz range of a typical satellite TV system.

Radome 340 (shown with a cut-away view to reveal LTE module 320 and BHR 330) may provide a weatherproof enclosure to protect RF antenna 310, LTE module 320, BHR 330, and/or other components of outdoor broadband unit 200. Generally, radome 340 may include any RF transparent or substantially RF transparent structure (e.g., a cover) that protects components in an outdoor environment.

As further shown in FIG. 3, a communication cable 360 (e.g., a coaxial cable) may connect outdoor broadband unit 200 to an interface component 370 of satellite antenna 202 that receives transmissions received by satellite antenna 202. The transmissions received by satellite antenna 202 may be provided to outdoor broadband unit 200 via communication cable 360 and interface component 370. Outdoor broadband unit 200 may receive the satellite transmissions and may receive RF signals via RF antenna 310. Outdoor broadband unit 200 may utilize a communication cable (e.g., coaxial cable 204) to provide the received satellite transmissions and the received RF signals to the indoor portion of customer premises network 110.

Combined gateway equipment 115 may be integrated with the SWiM environment associated with satellite antenna 202 to provide both TV service and broadband wireless service. With this architecture, combined gateway equipment 115 may require only one coax line leading from outdoor broadband unit 200/satellite antenna 202. This single coaxial line (e.g., coax cable 204) may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of combined gateway equipment 115, in other implementations, combined gateway equipment 115 may contain fewer components, different components, differently arranged components, and/or additional components than depicted in FIG. 3. Alternatively, or additionally, one or more components of combined gateway equipment 115 may perform one or more other tasks described as being performed by one or more other components of combined gateway equipment 115. In one alternative implementation, one or more functions of combined gateway equipment 115 may be moved to another location, such as internal to the customer premises. For example, a bridge may be installed in combined gateway equipment 115 instead of BHR 330. The bridge may function to combine coaxial input from satellite antenna 202 with the output from LTE module 320 into a single coax line, which may be forwarded to a broadband router that is installed inside the customer premises.

FIG. 4 is a diagram of example components of a device 400 that may correspond to one of the devices of environment 100 and/or customer premises network 110 (e.g., LTE module 320 and/or BHR 330). As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 110.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

FIGS. 5A-5D are diagrams of example operations 500 capable of being performed by outdoor broadband unit 200. In one example, FIG. 5A may depict operations 500 performed by outdoor broadband unit 200 during an installation mode. Outdoor broadband unit 200 may be in the installation mode after an installer installs outdoor broadband unit 200 at the customer premises at a time ($T_o$). The installation mode may assist the installer with placement of extension arm 350 during installation of outdoor broadband unit 200, and may last a configurable period time. During the installation mode, LTE module 320 may receive an indication 510 that outdoor broadband unit 200 is in the installation mode, and LTE module 320 may scan beams of RF antenna 310 in response to indication 510. For example, LTE module 320 may scan, at particular scanning time intervals, RF signals 520 received by each beam of RF antenna 310. LTE module 320 may select a best or optimal beam of RF antenna 310 based on RF signals 520 received by the beams of RF antenna 310, as indicated by reference number 530. For example, LTE module 320 may select a beam of RF antenna 310, which receives the strongest RF signals 520, as the best or optimal beam of RF antenna 310. In one example implementation, LTE module 320 may utilize the selected beam of RF antenna 310 to communicate with base station 120 and/or network 130.

Figure 5B:
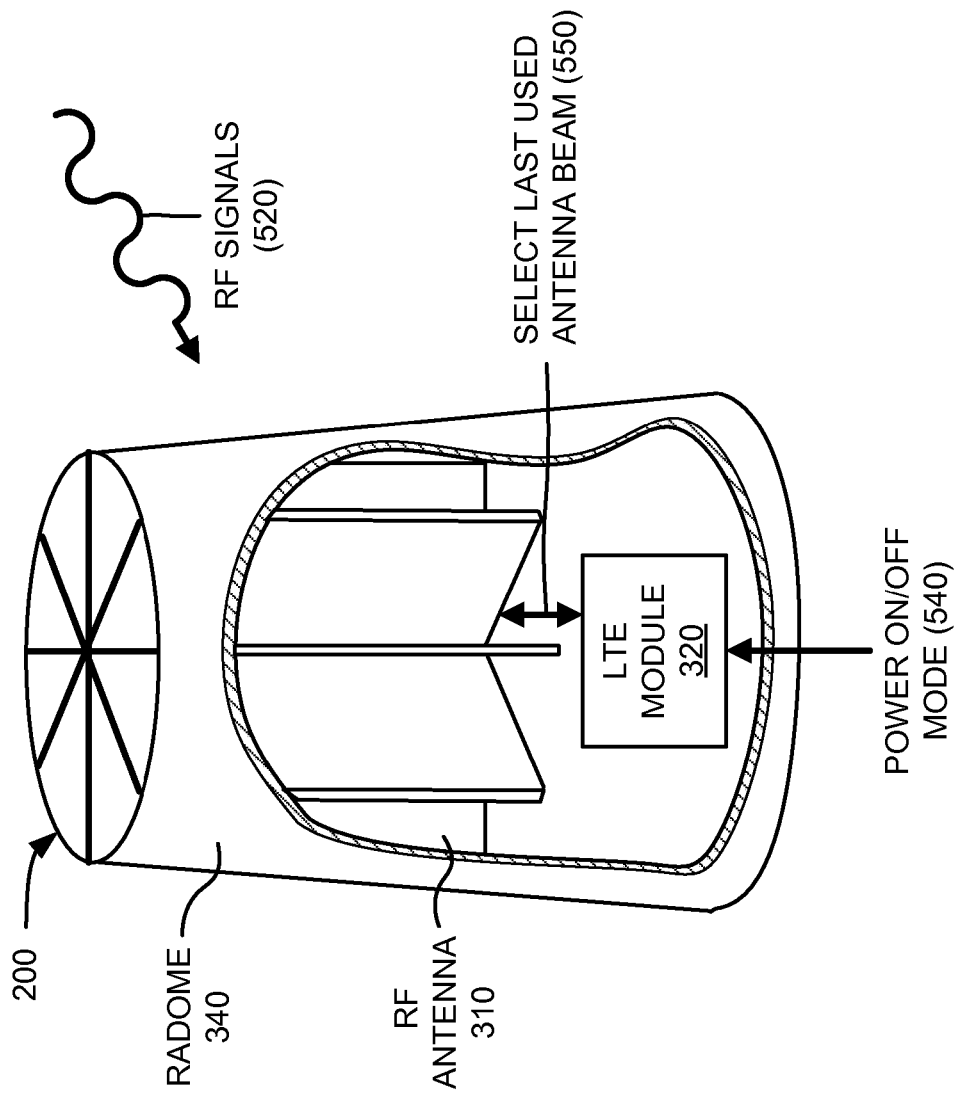

FIG. 5B may depict operations 500 performed by outdoor broadband unit 200 during a power on/off mode. Outdoor broadband unit 200 may enter the power on/off mode after outdoor broadband unit 200 is powered off and powered on (i.e., power cycled). During the power on/off mode, LTE module 320 may receive an indication 540 that outdoor broadband unit 200 is in the power on/off mode. Rather than scanning the beams of RF antenna 310, LTE module 320 may select a beam of RF antenna 310 that was last used by outdoor broadband unit 200 before outdoor broadband unit 200 was powered off, as indicated by reference number 550. In one example implementation, LTE module 320 may utilize the selected beam of RF antenna 310 to communicate with base station 120 and/or network 130. By using a last used beam of RF antenna 310, LTE module 320 may forego the time-consuming process of scanning all beams of RF antenna 310, as is performed in the installation mode (FIG. 5A).

Figure 5C:
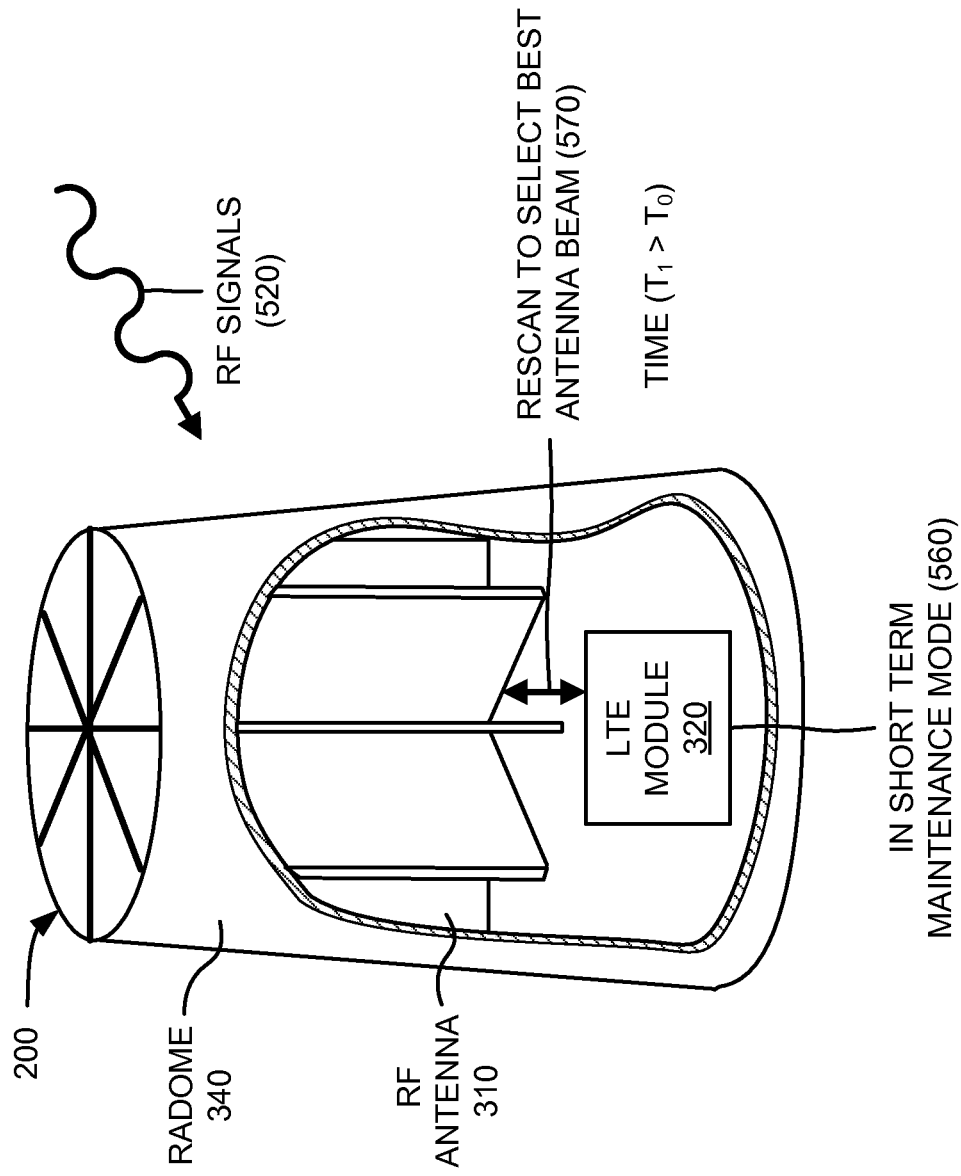

FIG. 5C may depict operations 500 performed by outdoor broadband unit 200 during a short term maintenance mode 560. Outdoor broadband unit 200 may enter short term maintenance mode 560 after a short term maintenance mode time period (e.g., a number of hours). For example, outdoor broadband unit 200 may enter short term maintenance mode 560 at a time ($T_1$) that is a particular number of hours after time ($T_o$) or after the power on/off mode. During short term maintenance mode 560, LTE module 320 may rescan the beams of RF antenna 310. For example, LTE module 320 may rescan, at particular scanning time intervals, RF signals 520 received by each beam of RF antenna 310. LTE module 320 may select a best or optimal beam of RF antenna 310 based on RF signals 520 received by the beams of RF antenna 310, as indicated by reference number 570. For example, LTE module 320 may select a beam of RF antenna 310, which receives the strongest RF signals 520, as the best or optimal beam of RF antenna 310. LTE module 320 may utilize the selected beam of RF antenna 310 to communicate with base station 120 and/or network 130. In one example implementation, outdoor broadband unit 200 may behave differently in short term maintenance mode 560 depending on whether outdoor broadband unit 200 is in an active state (i.e., actively communicating with LTE network 130) or an idle state (i.e., not actively communicating with LTE network 130). For example, when outdoor broadband unit 200 is in the active state, LTE module 320 may select a best or optimal beam of RF antenna 310 for a current serving cell (e.g., base station 120). When outdoor broadband unit 200 is in the idle state, LTE module 320 may select a best or optimal beam of RF antenna 310 as well as an optimal serving cell, which may be different than the current serving cell.

FIG. 5D may depict operations 500 performed by outdoor broadband unit 200 during a long term maintenance mode 580. Outdoor broadband unit 200 may enter long term maintenance mode 580 after a long term maintenance mode time period (e.g., a number of days). For example, outdoor broadband unit 200 may enter long term maintenance mode 580 at a time ($T_2$) that is a particular number of days after time ($T_1$) and/or time ($T_0$). During long term maintenance mode 580, LTE module 320 may rescan the beams of RF antenna 310. For example, LTE module 320 may rescan, at particular scanning time intervals, RF signals 520 received by each beam of RF antenna 310. LTE module 320 may select a best or optimal beam of RF antenna 310 based on RF signals 520 received by the beams of RF antenna 310, as indicated by reference number 590. For example, LTE module 320 may select a beam of RF antenna 310, which receives the strongest RF signals 520, as the best or optimal beam of RF antenna 310. In one example implementation, LTE module 320 may utilize the selected beam of RF antenna 310 to communicate with base station 120 and/or network 130. In contrast to short term maintenance mode 560, the scanning performed in long term maintenance mode 580 may use different scanning parameters, such as different scanning time intervals. In one example implementation, during long term maintenance mode 580, LTE module 320 may also search for a new optimal serving cell in addition to the current serving cell. Long term maintenance mode 580 may result in outdoor broadband unit 200 ceasing communications with LTE network 130. Thus, long term maintenance mode 580 may be scheduled to be performed during a time when outdoor broadband unit 200 may not be used (e.g., in the early morning hours).

In one example implementation, LTE module 320 may perform the scanning of the beams of RF antenna 310 at particular time intervals that depend on a mode associated with outdoor broadband unit 200. The particular scanning time intervals may depend on a measurement confidence level and the installation time associated with outdoor broadband unit 200. For example, if the particular scanning time intervals are less than one second, a signal quality measurement time (e.g., of RF signals 520) may be less than twenty time slots intervals, and the measurement of beams of RF antenna 310 may have a lower confidence level. In another example, if the particular scanning time intervals are longer than two minutes, the scanning performed during the installation mode may require more than five minutes to complete.

In another example implementation, during the power on/off mode, the determination of the last used antenna beam may take less than ten seconds.

In still another example implementation, during the short term maintenance mode, the particular scanning time interval, for each antenna beam, may be short (e.g., less than eight milliseconds) in order to achieve the best antenna connection without any service interruption. This procedure may be repeated until all configurable antenna beams are scanned. A period of time between each antenna beam scan may be greater than one-hundred milliseconds. The short term maintenance mode may occur after a short term maintenance mode time period, such as a number of hours (e.g., two hours). The short term maintenance mode time period may be configured by a user or an installer of outdoor broadband unit 200.

In a further example implementation, during the long term maintenance mode, LTE module 320 may scan every beam of RF antenna 310 in less than ten seconds. However, a search for a new serving cell identifier on every beam of RF antenna 310 may require more time. The long term maintenance mode may be repeated after a long term maintenance mode time period, such as a number of days (e.g., seven days). The long term maintenance mode scanning time period may be configured by a user or an installer of outdoor broadband unit 200.

Although FIGS. 5A-5D show example operations 500 capable of being performed by outdoor broadband unit 200, in other implementations, outdoor broadband unit 200 may perform fewer operations, different operations, and/or additional operations than depicted and described in connection with FIGS. 5A-5D.

In one implementation, outdoor broadband unit 200 may not include an internal real-time clock. In order for the modes of outdoor broadband unit 200 to properly function, outdoor broadband unit 200 may need to be provided with a current time. Without an internal clock, outdoor broadband unit 200 may not be able to determine if a short term maintenance mode time period has expired (e.g., which may indicate that outdoor broadband unit 200 needs to enter the short term maintenance mode). Moreover, without an internal clock, outdoor broadband unit 200 may not be able to determine if a long term maintenance mode time period has expired (e.g., which may indicate that outdoor broadband unit 200 needs to enter the long term maintenance mode) or may cause the long term maintenance mode to be triggered (e.g., an result in an outage) at an inopportune time, such as during the middle of the day. There also may be no way for outdoor broadband unit 200 to alter the short term maintenance mode time period and/or the long term maintenance mode time period after outdoor broadband unit 200 is installed.

Furthermore, outdoor broadband unit 200 may not be able to distinguish between the power on/off mode and the installation mode since during both modes outdoor broadband unit 200 is powered on from a powered off state. Thus, when outdoor broadband unit 200 is power cycled, outdoor broadband unit 200 may mistakenly enter the installation mode, which, as described above, may be a time consuming process.

Figure 6:
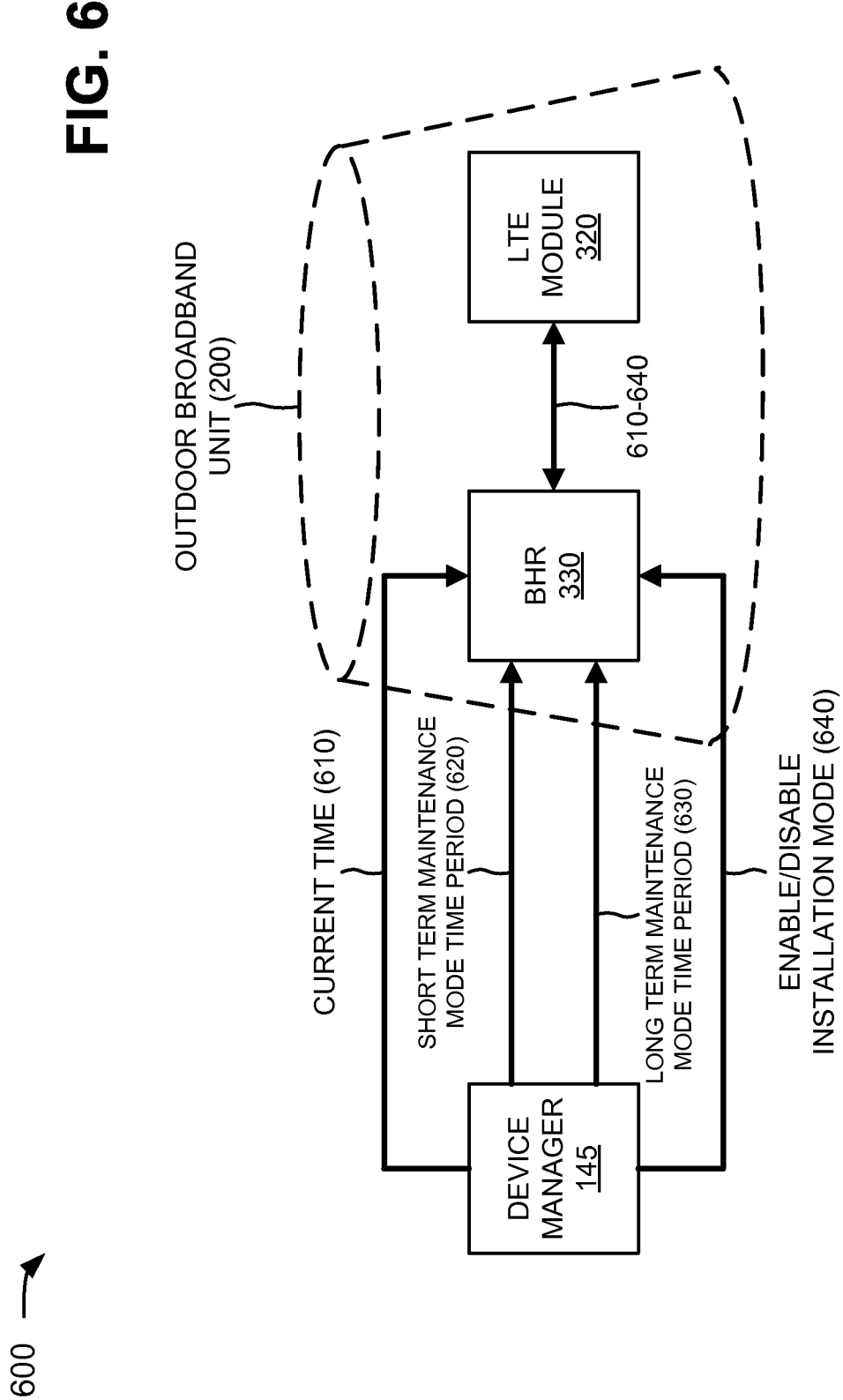
FIG. 6 is a diagram of example operations capable of being performed by an example portion of the environment illustrated in FIG. 1.

FIG. 6 is a diagram of example operations capable of being performed by an example portion 600 of environment 100. In one example implementation, the operations described in connection with FIG. 6 may address the issues described above in connection with FIGS. 5A-5D. As shown in FIG. 6, environment portion 600 may include device manager 145, outdoor broadband unit 200, LTE module 320, and BHR 330. Device manager 145, outdoor broadband unit 200, LTE module 320, and BHR 330 may include the features described above in connection with one or more of, for example, FIGS. 1-5D.

As further shown in FIG. 6, device manager 145 may provide a current time 610 to BHR 330. Current time 610 may include a date, hours, minutes, and seconds (e.g., Mar. 31, 2011, 9:30:32 AM) and may enable a network administrator, via device manager 145, to set a time in BHR 330. BHR 330 may provide current time 610 to LTE module 320 and LTE module 320 may receive current time 610. With current time 610, LTE module 320 may determine if a short term maintenance mode time period has expired (e.g., which may indicate that outdoor broadband unit 200 needs to enter the short term maintenance mode), and may determine if a long term maintenance mode time period has expired (e.g., which may indicate that outdoor broadband unit 200 needs to enter the long term maintenance mode).

The network administrator may also set, via device manager 145, a short term maintenance mode time period 620 and a long term maintenance mode time period 630. Short term maintenance mode time period 620 may include a time period (e.g., in a number of hours) after the installation mode or the power on/off mode. Long term maintenance mode time period 630 may include a time period (e.g., a number of days, a time of day, a day of the week, etc.) after the installation mode or the power on/off mode. Device manager 145 may provide short term maintenance mode time period 620 and long term maintenance mode time period 630 to BHR 330 and BHR 330 may forward short term maintenance mode time period 620 and long term maintenance mode time period 630 to LTE module 320.

In one example, short term maintenance mode time period 620, long term maintenance mode time period 630, and/or other parameters (e.g., scanning time intervals, RF signal thresholds, RF signal performance requirements, etc.) associated with these modes may configured in outdoor broadband unit 200 in other ways. For example, short term maintenance mode time period 620 and long term maintenance mode time period 630 may be set a factory during manufacture of outdoor broadband unit 200, may be set at distribution center prior to installation of outdoor broadband unit 200, may be set during installation of outdoor broadband unit 200, or may be set remotely after installation of outdoor broadband unit 200, as described above. In another implementation, the network administrator, via device manager 145, may set other parameters associated with the installation mode, the power on/off mode, the short term maintenance mode, and/or the long term maintenance mode. In still another implementation, the network administrator, via device manager 145, may enable or disable the short term maintenance mode and/or the long term maintenance mode. The short term maintenance mode and/or the long term maintenance mode may also be enabled or disabled based on other timing information provided to outdoor broadband unit 200, via GPS information associated with outdoor broadband unit 200, a remote timing mechanism, etc. This may provide flexibility to select an exact time when the short term maintenance mode and/or the long term maintenance mode is to be activated.

LTE module 320 may receive short term maintenance mode time period 620 and long term maintenance mode time period 630, and may determine a mode associated with outdoor broadband unit 200 based on current time 610, short term maintenance mode time period 620, and/or long term maintenance mode time period 630. For example, if LTE module 320 determines that outdoor broadband unit 200 is in the installation mode, LTE module 320 may perform the functions described above in connection with FIG. 5A. If LTE module 320 determines that outdoor broadband unit 200 is in the power on/off mode, LTE module 320 may perform the functions described above in connection with FIG. 5B. If LTE module 320 determines that outdoor broadband unit 200 is in the short term maintenance mode, LTE module 320 may perform the functions described above in connection with FIG. 5C. If LTE module 320 determines that outdoor broadband unit 200 is in the long term maintenance mode, LTE module 320 may perform the functions described above in connection with FIG. 5D.

As further shown in FIG. 6, the network administrator may, via device manager 145, enable or disable the installation mode at outdoor broadband unit 200, as indicated by reference number 640. Device manager 145 may provide enable/disable installation mode indication 640 to BHR 330, and BHR 330 may provide indication 640 to LTE module 320. In one example, device manager 145 may enable the installation mode by providing installation mode indication 510 (FIG. 5A) to BHR 330 of outdoor broadband unit 200. BHR 330 may provide indication 510 to LTE module 320, and LTE module 320 may enable the installation mode based on indication 510. In another example, device manager 145 may disable the installation mode by providing power on/off mode indication 540 (FIG. 5B) to BHR 330 of outdoor broadband unit 200. BHR 330 may provide indication 540 to LTE module 320, and LTE module 320 may disable the installation mode and enable the power on/off mode. Such an arrangement may permit outdoor broadband unit 200 to distinguish between the power on/off mode and the installation mode when outdoor broadband unit 200 is power cycled.

Although FIG. 6 shows example components of environment portion 600, in other implementations, environment portion 600 may contain fewer components, different components, differently arranged components, or additional components than depicted in FIG. 6. Alternatively, or additionally, one or more components of environment portion 600 may perform one or more other tasks described as being performed by one or more other components of environment portion 600.

FIG. 7 is a diagram of example functional components of LTE module 320 of outdoor broadband unit 200. As illustrated, LTE module 320 may include a mode selector 700, an installation mode component 705, a power on/off mode component 710, a short term maintenance mode component 715, a long term maintenance mode component 720, and an antenna beam selector 725. In one example implementation, the functions described in connection with FIG. 7 may be performed by one or more of the example components of device 400 (FIG. 4).

Mode selector 700 may receive installation mode indication 510, power on/off mode indication 540, and/or current time 610 from BHR 330 (not shown). Mode selector 700 may select a mode for LTE module 320 based on installation mode indication 510, power on/off mode indication 540, and/or current time 610. For example, mode selector 700 may select an installation mode 730 when installation mode indication 510 is received from BHR 330. Mode selector 700 may select a power on/off mode 735 when power on/off mode indication 540 is received from BHR 330. Mode selector 700 may select a short term maintenance mode 740 when current time 610 indicates that short term maintenance mode time period 620 is about to expire. Mode selector 700 may select a long term maintenance mode 745 when current time 610 indicates that long term maintenance mode time period 630 is about to expire. Based on the selected mode, LTE module 320 may implement one of components 705-720.

Installation mode component 705 may be activated when installation mode 730 is selected by mode selector 700, and may receive enable/disable installation mode indication 640 from BHR 330. Installation mode component 705 may generate a command 750 instructing antenna beam selector 725 to scan beams of RF antenna 310 when indication 640 indicates that the installation mode is enabled. For example, command 750 may instruct antenna beam selector 725 to scan, at particular scanning time intervals, RF signals received by each beam of RF antenna 310.

Power on/off mode component 710 may be activated when power on/off mode 735 is selected by mode selector 700. Rather than instructing antenna beam selector 725 to scan the beams of RF antenna 310, power on/off mode component 710 may generate a command 755 instructing LTE module 320 to select a beam of RF antenna 310 that was last used by outdoor broadband unit 200 before outdoor broadband unit 200 was powered off.

Short term maintenance mode component 715 may be activated when short term maintenance mode 740 is selected by mode selector 700, and may receive short term maintenance mode time period 620 from BHR 330. When short term maintenance mode time period 620 expires (e.g., at time 1 ($T_1$) of FIG. 5C), short term maintenance mode component 715 may generate a command 760 instructing antenna beam selector 725 to rescan beams of RF antenna 310. For example, command 760 may instruct antenna beam selector 725 to rescan, at particular scanning time intervals, RF signals received by each beam of RF antenna 310.

Long term maintenance mode component 720 may be activated when long term maintenance mode 745 is selected by mode selector 700, and may receive long term maintenance mode time period 630 from BHR 330. When long term maintenance mode time period 630 expires (e.g., at time 2 ($T_2$) of FIG. 5D), long term maintenance mode component 720 may generate a command 765 instructing antenna beam selector 725 to rescan beams of RF antenna 310. For example, command 765 may instruct antenna beam selector 725 to rescan, at particular scanning time intervals, RF signals received by each beam of RF antenna 310.

When antenna beam selector 725 receives command 750 from installation mode component 705, antenna beam selector 725 may scan 770 beams (e.g., beams 1-8) of RF antenna 310. For example, antenna beam selector 725 may scan, at particular scanning time intervals, RF signals received by each beam of RF antenna 310. Antenna beam selector 725 may select a best or optimal beam of RF antenna 310 based on RF signals received by the beams of RF antenna 310, as indicated by reference number 775. For example, antenna beam selector 725 may select a beam of RF antenna 310, which receives the strongest RF signals, as the best or optimal beam of RF antenna 310. In one example implementation, LTE module 320 may utilize the selected beam of RF antenna 310 to communicate with base station 120 and/or network 130.

When antenna beam selector 725 receives command 760 from short term maintenance mode component 715, antenna beam selector 725 rescan 770 the beams of RF antenna 310. For example, antenna beam selector 725 may rescan, at particular scanning time intervals, RF signals received by each beam of RF antenna 310. Antenna beam selector 725 may select a best or optimal beam of RF antenna 310 based on RF signals received by the beams of RF antenna 310, as indicated by reference number 780. For example, antenna beam selector 725 may select a beam of RF antenna 310, which receives the strongest RF signals, as the best or optimal beam of RF antenna 310. In one example implementation, LTE module 320 may utilize the selected beam of RF antenna 310 to communicate with base station 120 and/or network 130.

When antenna beam selector 725 receives command 765 from long term maintenance mode component 720, antenna beam selector 725 rescan 770 the beams of RF antenna 310. For example, antenna beam selector 725 may rescan, at particular scanning time intervals, RF signals received by each beam of RF antenna 310. Antenna beam selector 725 may select a best or optimal beam of RF antenna 310 based on RF signals received by the beams of RF antenna 310, as indicated by reference number 785. For example, antenna beam selector 725 may select a beam of RF antenna 310, which receives the strongest RF signals, as the best or optimal beam of RF antenna 310. In one example implementation, LTE module 320 may utilize the selected beam of RF antenna 310 to communicate with base station 120 and/or network 130.

Although FIG. 7 shows example functional components of LTE module 320, in other implementations, LTE module 320 may contain fewer functional components, different functional components, differently arranged functional components, or additional functional components than depicted in FIG. 7. Alternatively, or additionally, one or more functional components of LTE module 320 may perform one or more other tasks described as being performed by one or more other functional components of LTE module 320.

FIG. 8 is a flow chart of an example process 800 for scanning and selecting an antenna beam provided in a fixed wireless CPE according to an implementation described herein. In one implementation, process 800 may be performed by LTE module 320 of outdoor broadband unit 200. In another implementation, some or all of process 800 may be performed by another device or group of devices, including or excluding LTE module 320.

As shown in FIG. 8, process 800 may include receiving a current time from a remote network device (block 805), receiving a short term maintenance mode time period from the network device (block 810), and receiving a long term maintenance mode time period from the network device (block 815). For example, in implementations described above in connection with FIG. 6, device manager 145 may provide current time 610 to BHR 330. Current time 610 may include a date, hours, minutes, and seconds (e.g., Mar. 31, 2011, 9:30:32 AM) and may enable a network administrator, via device manager 145, to set a time in BHR 330. BHR 330 may provide current time 610 to LTE module 320 and LTE module 320 may receive current time 610. The network administrator may also set, via device manager 145, short term maintenance mode time period 620 and long term maintenance mode time period 630. Device manager 145 may provide short term maintenance mode time period 620 and long term maintenance mode time period 630 to BHR 330 and BHR 330 may forward short term maintenance mode time period 620 and long term maintenance mode time period 630 to LTE module 320.

As further shown in FIG. 8, process 800 may include determining a mode associated with antenna beam selection based on the current time, the short term maintenance mode time period, and/or the long term maintenance mode time period (block 820). If the determined mode is an installation mode (block 820—INSTALLATION MODE), process 800 may include scanning antenna beams after installation (block 825) and selecting a best antenna beam based on the scan (block 830). For example, in implementations described above in connection with FIGS. 5A and 6, LTE module 320 may receive short term maintenance mode time period 620 and long term maintenance mode time period 630, and may determine a mode associated with outdoor broadband unit 200 based on current time 610. For example, if LTE module 320 determines that outdoor broadband unit 200 is in the installation mode, LTE module 320 may scan beams of RF antenna 310. LTE module 320 may select a best or optimal beam of RF antenna 310 based on RF signals 520 received by the beams of RF antenna 310, as indicated by reference number 530. In one example, LTE module 320 may select a beam of RF antenna 310, which receives the strongest RF signals 520, as the best or optimal beam of RF antenna 310.

Returning to FIG. 8, if the determined mode is a power on/off mode (block 820—POWER ON/OFF MODE), process 800 may include selecting a last used antenna beam before a power off (block 835). For example, in implementations described above in connection with FIGS. 5B and 6, if LTE module 320 determines that outdoor broadband unit 200 is in the power on/off mode, rather than scanning the beams of RF antenna 310, LTE module 320 may select a beam of RF antenna 310 that was last used by outdoor broadband unit 200 before outdoor broadband unit 200 was powered off, as indicated by reference number 550.

As further shown in FIG. 8, if the determined mode is a short term maintenance mode (block 820—SHORT TERM MAINT. MODE), process 800 may include rescanning the antenna beams after a short term maintenance mode time period (block 840) and selecting a best antenna beam and/or serving cell based on the rescan (block 845). For example, in implementations described above in connection with FIGS. 5C and 6, if LTE module 320 determines that outdoor broadband unit 200 is in the short term maintenance mode, LTE module 320 may enter short term maintenance mode 560 after a short term maintenance mode time period (e.g., a number of hours). During short term maintenance mode 560, LTE module 320 may rescan the beams of RF antenna 310. In one example, LTE module 320 may rescan, at particular scanning time intervals, RF signals 520 received by each beam of RF antenna 310. LTE module 320 may select a best or optimal beam of RF antenna 310 based on RF signals 520 received by the beams of RF antenna 310, as indicated by reference number 570. In another example, when outdoor broadband unit 200 is in the active state, LTE module 320 may select a best or optimal beam of RF antenna 310 for a current serving cell (e.g., base station 120). When outdoor broadband unit 200 is in the idle state, LTE module 320 may select a best or optimal beam of RF antenna 310 as well as an optimal serving cell, which may be different than the current serving cell.

Returning to FIG. 8, if the determined mode is a long term maintenance mode (block 820—LONG TERM MAINT. MODE), process 800 may include rescanning the antenna beams after a long term maintenance mode time period (block 850) and selecting a best antenna beam and/or serving cell based on the rescan (block 855). For example, in implementations described above in connection with FIGS. 5D and 6, if LTE module 320 determines that outdoor broadband unit 200 is in the long term maintenance mode, LTE module 320 may enter long term maintenance mode 580 after a long term maintenance mode time period (e.g., a number of days). During long term maintenance mode 580, LTE module 320 may rescan the beams of RF antenna 310. In one example, LTE module 320 may rescan, at particular scanning time intervals, RF signals 520 received by each beam of RF antenna 310. LTE module 320 may select a best or optimal beam of RF antenna 310 based on RF signals 520 received by the beams of RF antenna 310, as indicated by reference number 590. In another example, during long term maintenance mode 580, LTE module 320 may also search for a new optimal serving cell in addition to the current serving cell.

FIG. 9 is a flow chart of an example process 900 for providing configuration parameters to a fixed wireless CPE to enable antenna beam scanning and selecting according to an implementation described herein. In one implementation, process 900 may be performed by device manager 145. In another implementation, some or all of process 900 may be performed by another device or group of devices, including or excluding device manager 145.

As shown in FIG. 9, process 900 may include providing a current time to a remote outdoor broadband unit (block 910), and providing a short term maintenance mode time period to the outdoor broadband unit (block 920). For example, in implementations described above in connection with FIG. 6, device manager 145 may provide current time 610 to BHR 330. Current time 610 may include a date, hours, minutes, and seconds (e.g., Mar. 31, 2011, 9:30:32 AM) and may enable a network administrator, via device manager 145, to set a time in BHR 330. BHR 330 may provide current time 610 to LTE module 320 and LTE module 320 may receive current time 610. The network administrator may also set, via device manager 145, short term maintenance mode time period 620 that includes a time period (e.g., in a number of hours) after the installation mode or the power on/off mode. Device manager 145 may provide short term maintenance mode time period 620 to BHR 330 and BHR 330 may forward short term maintenance mode time period 620 to LTE module 320.

As further shown in FIG. 9, process 900 may include providing a long term maintenance mode time period to the outdoor broadband unit, where the outdoor broadband unit selects a best antenna beam based on the current time, the short term maintenance mode time period, and/or the long term maintenance mode time period (block 930). For example, in implementations described above in connection with FIG. 6, the network administrator may set, via device manager 145, long term maintenance mode time period 630. Long term maintenance mode time period 630 may include a time period (e.g., in a number of days) after the installation mode or the power on/off mode. Device manager 145 may provide long term maintenance mode time period 630 to BHR 330 and BHR 330 may forward long term maintenance mode time period 630 to LTE module 320. LTE module 320 may receive long term maintenance mode time period 630, and may select a best antenna beam from RF antenna 310 based on current time 610, short term maintenance mode time period 620, and/or long term maintenance mode time period 630, and based on the antenna scanning performed during the selected short term or long term maintenance mode.

Returning to FIG. 9, process 900 may include instructing the outdoor broadband unit to enable or disable the installation mode of the outdoor broadband unit (block 940). For example, in implementations described above in connection with FIG. 6, the network administrator may, via device manager 145, enable or disable the installation mode at outdoor broadband unit 200, as indicated by reference number 640. Device manager 145 may provide enable/disable installation mode indication 640 to BHR 330, and BHR 330 may provide indication 640 to LTE module 320. In one example, device manager 145 may enable the installation mode by providing installation mode indication 510 to outdoor broadband unit 200, and LTE module 320 may enable the installation mode based on indication 510. In another example, device manager 145 may disable the installation mode by providing power on/off mode indication 540 to outdoor broadband unit 200, and LTE module 320 may disable the installation mode and enable the power on/off mode. In still another example, the installation mode may terminate after a fixed number of short term maintenance mode time periods have elapsed.

Systems and/or methods described herein may provide configuration parameters that enable antenna beam scanning and selecting, to a CPE wireless architecture that includes combined gateway equipment. The combined gateway equipment may include satellite and RF antennas that are installed at a customer premises. The RF antenna may be provided in an outdoor broadband unit that includes a LTE module capable of communicating with a wireless network. The outdoor broadband unit may also include a BHR capable of communicating with a customer premises network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by customer premises equipment, a current time from a remote network device;
   receiving, by the customer premises equipment, a first time period from the remote network device, wherein the first time period is associated with a short term maintenance mode;
   receiving, by the customer premises equipment, a second time period from the remote network device, wherein the second time period is associated with a long term maintenance mode and wherein the second time period is longer than the first time period;
   determining, by the customer premises equipment, a mode associated with selection of an antenna beam of a plurality of antenna beams of a directional antenna of the customer premises equipment, based on at least one of the current time, the first time period, and the second time period; and
   selecting, by the customer premises equipment, a first antenna beam of the plurality of antenna beams to use based on the determined mode.

2. The method of claim 1, wherein, when the determined mode is an installation mode, the method further comprises:
   scanning the plurality of antenna beams of the directional antenna after installation of the customer premises equipment; and
   selecting the first antenna beam as an optimal antenna beam of the plurality of antenna beams to use based on the scanning.

3. The method of claim 1, wherein, when the determined mode comprises a power on/off mode, the method further comprises:
   selecting the first antenna beam, comprising a last used antenna beam of the plurality of antenna beams before the customer premises equipment was last powered off, to use.

4. The method of claim 1, wherein, when the determined mode comprises the short term maintenance mode, the method further comprises:
   rescanning, based on a scanning interval corresponding to the short term maintenance mode, the plurality of antenna beams of the directional antenna after the first time period expires; and
   selecting the first antenna beam as an optimal antenna beam of the plurality of antenna beams, and selecting an optimal serving cell, to use based on the rescanning.

5. The method of claim 1, wherein, when the determined mode comprises the long term maintenance mode, the method further comprises:
   rescanning, based on a scanning interval corresponding to the long term maintenance mode, the plurality of antenna beams of the directional antenna after the second time period expires; and
   selecting the first antenna beam as an optimal antenna beam of the plurality of antenna beams, and selecting an optimal serving cell, to use based on the rescanning.

6. The method of claim 1, wherein the first time period is a predetermined number of hours and the second time period is a predetermined number of days.

7. The method of claim 1, further comprising:
   receiving, from the remote network device, other parameters associated with the determined mode.

8. A customer premises equipment, comprising:
   a directional antenna that includes a plurality of antenna beams; and
   a processor to:
      receive a current time from a remote network device,
      receive a first time period from the remote network device, wherein the first time period is associated with a short term maintenance mode,
      receive a second time period from the remote network device, wherein the second time period is associated with a long term maintenance mode and wherein the second time period is longer than the first time period,
      determine a mode associated with selection of an antenna beam of the plurality of antenna beams of the directional antenna based on at least one of the current time, the first time period, and the second time period, where the determined mode includes one of an installation mode, a power on/off mode, the short term maintenance mode, or a long term maintenance mode, and
      select a first antenna beam of the plurality of antenna beams to use based on the determined mode.

9. The customer premises equipment of claim 8, wherein, when the determined mode is the installation mode, the processor is further to:
scan the plurality of antenna beams of the directional antenna after installation of the customer premises equipment, and
select the first antenna beam as an optimal antenna beam of the plurality of antenna beams to use based on the scanning.

10. The customer premises equipment of claim 8, wherein, when the determined mode comprises the power on/off mode, the processor is further to:
select the first antenna beam, comprising a last used antenna beam of the plurality of antenna beams before the outdoor broadband unit was last powered off, to use.

11. The customer premises equipment of claim 8, wherein, when the determined mode comprises the short term maintenance mode, the processor is further to:
rescan the plurality of the antenna beams of the directional antenna after the first time period expires, and
select the first antenna beam an optimal antenna beam of the plurality of antenna beams to use based on the rescanning.

12. The customer premises equipment of claim 8, wherein, when the determined mode is the long term maintenance mode, the processor is further to:
rescan the plurality of the antenna beams of the directional antenna after the second time period expires, and
select the first antenna beam an optimal antenna beam of the plurality of antenna beams to use based on the rescanning.

13. The customer premises equipment of claim 8, wherein the first time period is a predetermined number of hours and the time period is a predetermined number of days.

14. The customer premises equipment of claim 8, wherein:
the first time period replaces a previously configured first time period associated with the short term maintenance mode, and
the second time period replaces a previously configured second time period associated with the long term maintenance mode.

15. A method, comprising:
providing, by a computing device, a current time to a remote customer premises equipment;
providing, by the computing device, a first time period to the remote customer premises equipment, wherein the first time period is associated with a short term maintenance mode;
providing, by the computing device, a second time period to the remote customer premises equipment, wherein the remote customer premises equipment selects a first antenna beam, from a plurality of antenna beams of a directional antenna, as an optimal antenna beam based on an at least one of the current time, the first time period, and the second time period and wherein the second time period is longer than the first time period and is associated with a long term maintenance mode; and
instructing, by the computing device, the remote customer premises equipment to enable or disable an installation mode of the remote customer premises equipment.

16. The method of claim 15, wherein the first time period comprises a predetermined number of hours.

17. The method of claim 15, wherein the second time period comprises a predetermined number of days.

18. The method of claim 15, wherein the remote customer premises equipment selects the first antenna beam based on enablement or disablement of the installation mode.

19. A device comprising:
a memory to store a plurality of instructions; and
a processor to execute instructions in the memory to:
provide a current time to a remote customer premises equipment,
provide a first time period to the remote customer premises equipment, wherein the first time period is associated with a short term maintenance mode,
provide a second time period to the remote customer premises equipment, where the remote customer premises equipment selects a first antenna beam, from a plurality of antenna beams of a directional antenna, as an optimal antenna beam based on at least one of the current time, the first time period, and the second time period and wherein the second time period is longer than the first time period and is associated with a long term maintenance mode, and
instruct the remote customer premises equipment to enable or disable an installation mode of the remote customer premises equipment.

20. The device of claim 19, wherein the processor is further to:
instruct the remote customer premises equipment to enable or disable the short term maintenance mode of the remote customer premises equipment.

21. The device of claim 19, wherein the processor is further to:
instruct the remote customer premises equipment to enable or disable the long term maintenance mode of the remote customer premises equipment.

* * * * *